W. S. RYAN.
ELECTRICALLY OPERATED TIME MECHANISM.
APPLICATION FILED AUG. 16, 1917.

1,301,008.

Patented Apr. 15, 1919.
6 SHEETS—SHEET 1.

INVENTOR
Walter S Ryan
BY
Kiddle & Margery
ATTORNEY

W. S. RYAN.
ELECTRICALLY OPERATED TIME MECHANISM.
APPLICATION FILED AUG. 16, 1917.

1,301,008.

Patented Apr. 15, 1919.
6 SHEETS—SHEET 4.

INVENTOR
Walter S Ryan
BY
Kiddle Thurgood
HIS ATTORNEYS

Fig. 8.

UNITED STATES PATENT OFFICE.

WALTER S. RYAN, OF NEW YORK, N. Y.

ELECTRICALLY-OPERATED TIME MECHANISM.

1,301,008.  Specification of Letters Patent.  Patented Apr. 15, 1919.

Application filed August 16, 1917. Serial No. 186,493.

*To all whom it may concern:*

Be it known that I, WALTER S. RYAN, a citizen of the United States, and a resident of the borough of Manhattan, city of New York, in the county and State of New York, have invented certain new and useful Improvements in Electrically-Operated Time Mechanism, of which the following is a specification.

The invention relates to devices for periodically—at predetermined intervals—imparting a rotative movement to a member or moving said member toward and from a desired position. The member to be moved may be an electric switch that controls the flow of current to electric lights, to a motor or to any other place desired, or it may be a valve that controls the opening and closing of a gas supply, or a rotatable shaft.

In the form illustrated the invention is applied to a rotatable driven member herein referred to as a main switch that may be employed to control the periodic flow of electric current through a main circuit. This main switch may be considered as a driven member, or the part which actuates it may be considered a driven member dependent upon the manner in which this expression is employed.

One of the objects of the present invention is to construct an electrically-operated time-controlled device whereby a delicate compensated watch escapement may be employed to control the operation of a relatively large solenoid or motor capable of heavy duty, without interfering with the time keeping function of the escapement.

An inherent objection to other forms of electrically-wound time-controlled motors is that due to the variable inertia of the operated device the power delivered to the escapement changes from time to time resulting in the loss or gain in time. This defect is overcome by my invention, which is now successfully used for periodically turning up and down the light in a light-house in such a remote place that attention can only be given it every six months. It is obvious that unless such a device keeps very accurate time it defeats its own purpose.

In the preferred embodiment and realization of the invention the mechanism between the solenoid and the driven member or main switch is such that the clock or timing mechanism merely controls the initial closing of a circuit within which the solenoid coil or motor is included. The construction is also such that the solenoid or motor can be made as large as is required to effect the ultimate desired movement of the driven member or main switch. The power from the solenoid or motor, however, is preferably availed of to effect the rewinding of the clock. If, however, a separate solenoid or motor be employed for effecting the rewinding of the clock such a construction would come within the scope of certain phases of the invention when embodied in combination with other features of construction herein described and claimed.

Another object of the invention is to provide a construction in which the closing of the solenoid or motor circuit will be effected by means of a relatively small initial or closing switch that is associated with the clock or timing mechanism—and which switch is herein referred to as a "clock switch"—while a larger switch which is frequently referred to as a circuit maintaining and opening switch can be employed to maintain the solenoid or motor circuit closed until the solenoid has completed its work, at the end of which time this maintaining and opening switch is opened so as to disrupt the motor or solenoid circuit after the work has been accomplished. With such an arrangement of switches the initial closing switch is automatically opened before the maintaining and opening switch is opened, the latter being closed before the former is opened, and in order that this may be accomplished in the manner specified these two switches have been placed in parallel in the solenoid or motor circuit.

The invention relates to the features of construction above referred to as well as to other features of construction which will be hereinafter more fully pointed out.

As illustrating certain specific embodiments of the invention reference is made to the drawings forming a part of this specification and in which drawings.

In Fig. 5 the parts are shown on a larger scale than they are shown in Fig. 1; some of the members have been removed or shown only in part for the sake of clearness.

Fig. 6 is shown on the same scale as Fig. 5 but on a larger scale than Figs. 3 and 4.

Fig. 7 is a wiring diagram of the switch construction shown in Figs. 1 to 6 inclusive and in Fig. 8. According to the construction of Figs. 1 to 8 inclusive a single solenoid is employed to rewind the clock and to actuate the driven member, and in the construction shown in said figures the weight of the core of the solenoid supplies part of the energy to maintain the clock running.

In Fig. 8 there is illustrated a part of the mechanism whereby the clock is rewound by the solenoid and whereby the driven member or main switch is actuated by the same solenoid.

Fig. 9 shows a form of construction differing somewhat from that shown in Fig. 8. In the construction shown in Fig. 9 immediately upon the rewinding of the clock the core can be dropped and is independent of the clock train; in other words, does not supply any energy to assist in maintaining the clock running.

In Fig. 10 the construction of this maintaining and opening switch is somewhat different from that of the corresponding member shown in Fig. 8.

In the construction shown in Figs. 9 and 10 the solenoid core is free to drop immediately after it has been moved—that is lifted—to perform its work and after the solenoid has performed its work it is independent of the members moved thereby until it is again lifted.

*Clock or timing mechanism.*

The time switch as a whole, when in use, is preferably installed in a locked and sealed box or casing whereby the switch cannot be tampered with by unauthorized persons. As switches of this kind are liable to be positioned in exposed places this casing is also provided to protect the switch from the weather. A casing which will accomplish this purpose is of course manifest to a person skilled in the art and has not been illustrated.

Figure 7:
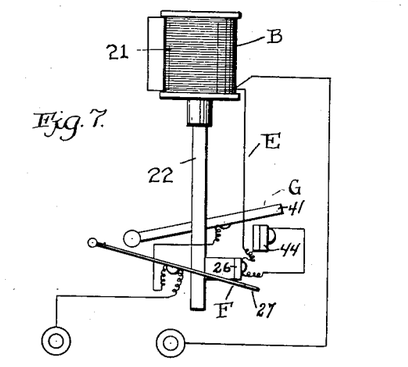

The time switch or time device as it may be more broadly defined comprises a clock or timing mechanism A, a solenoid or electric motor B that periodically winds or rewinds the clock, a driven member or rotatable main switch C, and mechanism D actuated by means of the solenoid or electric motor B for moving the driven member or rotatable main switch C and which mechanism D is frequently referred to as the actuating mechanism. The solenoid or motor B is included in an electric circuit E (see Fig. 7) which is initially closed by a clock switch F and which circuit is maintained closed and ultimately opened by means of a circuit maintaining and opening switch G. The switch F, as will hereinafter appear, is associated with the clock, that is with a part of the clock train or with a part movable with the clock train, so that when the clock unwinds a certain amount the switch F will be closed. The maintaining and opening switch G is associated with the actuating mechanism D in such a manner that shortly after the solenoid B starts to move the actuating mechanism— by movement of the core of the solenoid— said switch G will be closed and will be maintained closed until after the solenoid has performed its work after which time the switch G is automatically opened to disrupt the solenoid circuit, the switch F having been opened after said maintaining and opening switch G had been closed but prior to said maintaining and opening switch being opened, as just indicated.

Figure 3:
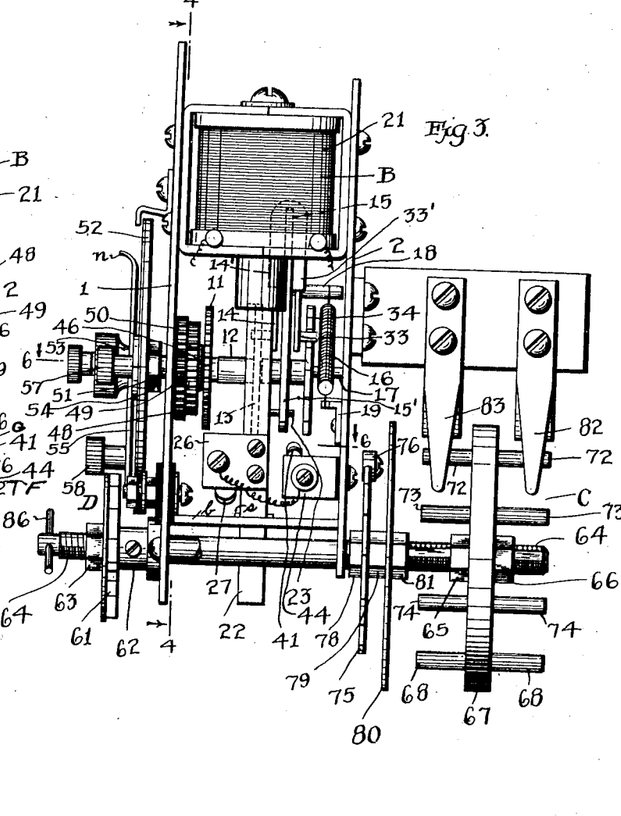
Fig. 3 is a side elevational view of the switch and is a view looking in the direction of the arrow A, Fig. 1.
Figure 4:
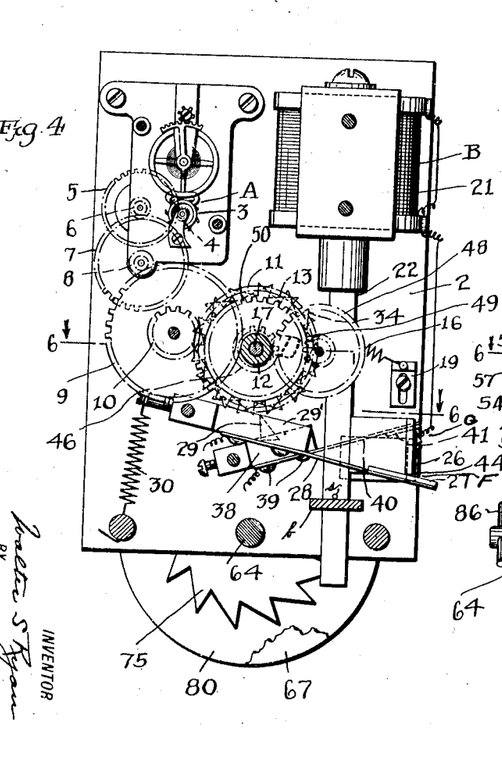
Fig. 4 is a vertical sectional view taken as on the line 4—4 of Fig. 3 looking in the direction of the arrows.
Figure 5:
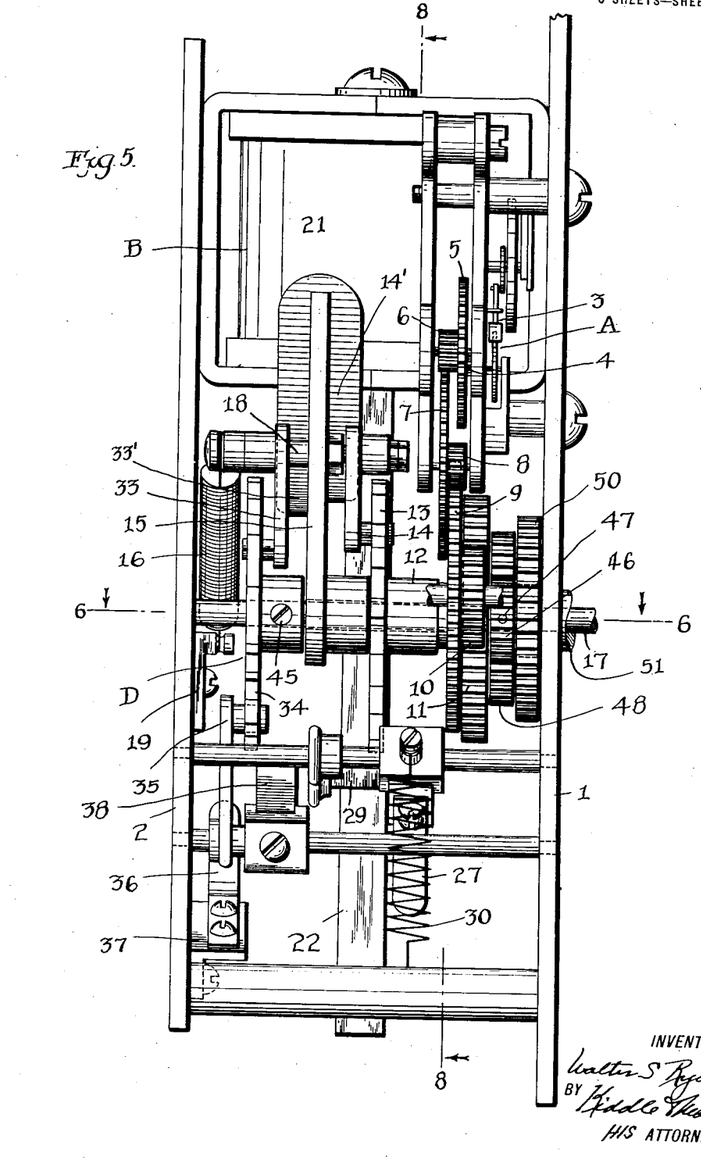
Fig. 5 is a side elevational view looking in the direction of the arrow B, Fig. 1.
Figure 6:
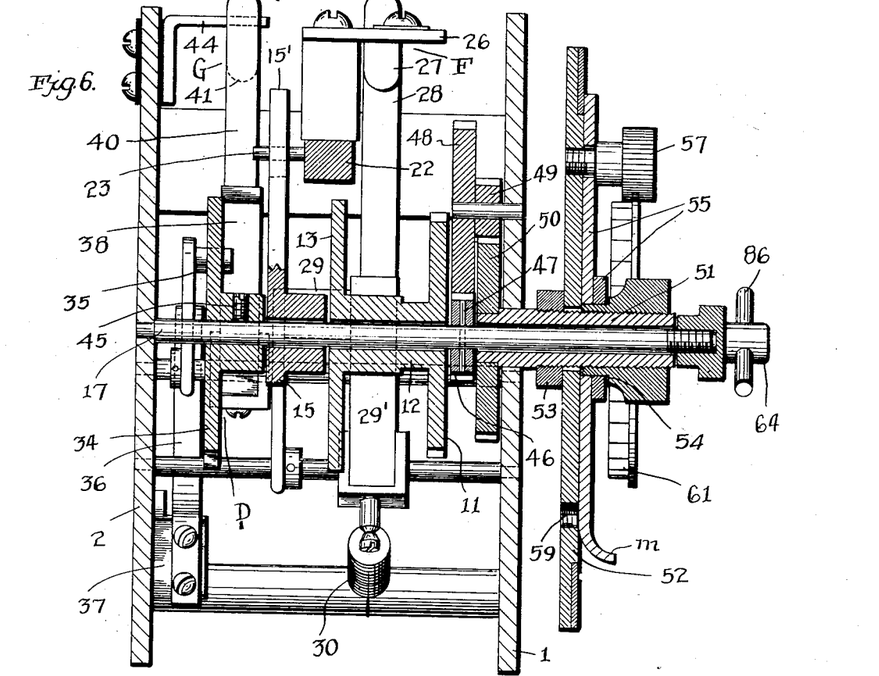
Fig. 6 is a sectional view taken as on the plane indicated by the lines —6—6 of Figs. 3, 4 and 5 looking in the direction of the arrows.

The movable members of the clock or timing mechanism A, the coil of the solenoid B, the driven member or rotatable main switch C and the movable members of the actuating mechanism D are all carried on a frame composed of the vertically extending frame members 1 and 2 which are secured in spaced relation with respect to each other, as will be manifest from an inspection of the drawings. The clock or timing mechanism A comprises an escapement mechanism 3 and a train having gears 4, 5, 6, 7, 8, 9, 10, 11 (see Fig. 4) hub 12, ratchet wheel 13 (see Figs. 3 and 6) ratchet-wheel moving pawl 14, carrier 15 for said pawl 14, which pawl is pivotally mounted upon said carrier, and a spring 16 (see Figs. 3 and 8). This spring continuously pulls on the carrier 15 in a direction tending to force the ratchet-wheel moving pawl 14 against the teeth of 13' the ratchet wheel 13 for the purpose of supplying energy to run the clock. The carrier 15 as well as the hub 12 to which gear 11 and the ratchet wheel 13 of the clock train are connected are mounted upon and revoluble relative to a shaft 17, as will clearly appear from an inspection of Figs. 5, 6 and 8. The shaft 17, as will hereinafter more fully appear, is a rotatable shaft and becomes a part of the actuating mechanism D but as just pointed out has been employed to support certain members of the clock train and which clock train members can move relatively to the shaft. One end of the spring 16 which is employed to supply energy for running the clock is connected by a pin 18 to the carrier 15 while the other end is connected by an adjustable member 19 by means of a screw to the vertically extending frame member 2. The carrier 15 has an extending portion 15′ which is the part engaged by and actuated from the movable member of the solenoid or motor B. The solenoid B has a coil 21 and a core 22 having thereupon an extension 23 which engages a slotted portion 25 of the extending portion 15′ of the carrier 15.

Figure 8:
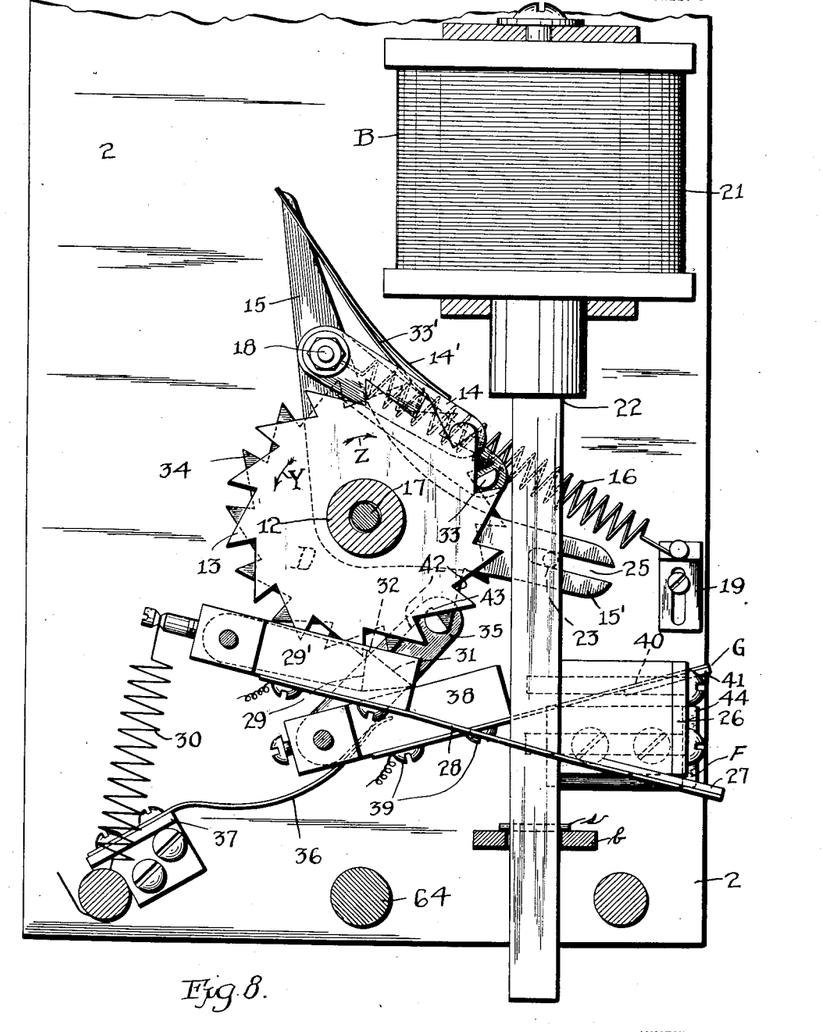
Fig. 8 is a vertical sectional view taken as on the broken line 8—8 of Fig. 5 looking in the direction of the arrows.

In the construction shown in Fig. 8 the core 22 of the solenoid B rests upon this extending portion 15′ and the weight of the core and the pull of the spring 16 coöperate to supply energy to maintain the clock running and during this time the energy thus supplied is transmitted through the ratchet-wheel moving pawl 14 to the teeth of the ratchet wheel 13 and moves said ratchet wheel in the direction of the arrow Z (see Fig. 8) until the clock has run down the desired amount, as will hereafter more fully appear.

Mention has heretofore been made of the clock switch or initial closing switch F, the function of which is to close the circuit E in which the solenoid B is included whereby the coil of said solenoid will be energized. This switch F in the construction shown in Fig. 8 comprises a contact member 26 which is carried by but insulated from the core extension 23. The other member of this switch F has a contact 27 carried on a spring 28 which is connected to or carried by a locking pawl 29 which is continuously spring-pressed by means of a spring 30 toward the ratchet wheel 13. As the clock continues to run down the core 22 gradually lowers thus causing the contact member 26 to gradually lower. Also as the clock runs down the outer end of a tooth of the ratchet wheel 13 slides upon and past the bevel face 31 of the locking pawl 29. The locking pawl 29 then moves inwardly—or upwardly—by the outer end of the tooth whereby the pawl 29 can perform its locking function. The upward movement of the locking pawl 29 moves the contact member 27 upwardly into engagement with the contact 26 of the core 22 which is now low enough to permit the engagement to take place, and in this manner circuit E will be completed through contacts 26 and 27 which constitute the clock switch or solenoid - circuit initial - closing switch F previously referred to. However, it will be observed from an inspection of Fig. 8 that the contacts 27 and 26 can remain in engagement with each other during only a short portion of the upward movement of the core 22 but the circuit will remain completed through the contacts 26 and 27 until after the circuit maintaining and opening switch G is closed and the latter switch remains closed whereby energy will continue to be supplied to the solenoid until the solenoid has completed its work. When the solenoid is deënergized and in its lowest position, as when the clock has completely run down, so that it no longer continues to run, then the solenoid can be supported in said extreme lowest position by a stop pin $s$ that engages a cross-bar $b$ carried by the spaced frame members 1 and 2. The locking pawl 29 may be considered to comprise the pawl member proper and also a block of insulating material 29′, that is the member to which the spring 28 is connected which carries the contact 27. When the coil 21 of the solenoid is energized so that the core 22 is being lifted to wind the clock, or in other words to place the spring 16 under tension and to raise the core, the locking pawl 29 is engaging a tooth of the ratchet wheel 13 so as to prevent movement in the direction of the arrow Y while the free end of the ratchet-wheel moving pawl 14 is sliding over the inclined face of a tooth of the ratchet wheel 13. This pawl 14 is normally spring-pressed toward its corresponding ratchet wheel by means of a spring 14′.

*Actuating mechanism.*

The actuating mechanism D will now be described before taking up the details of construction of the driven member or rotatable main switch C. The lifting of the core 22 of the solenoid B supplies the energy for moving the actuating mechanism D. This mechanism employs the same carrier 15 which has thereupon a second ratchet-wheel moving pawl 33 which is normally pressed by means of a spring 33′ against its corresponding ratchet wheel 34 which is shown in Fig. 8 as being located behind the ratchet wheel 13 and it will be observed that the teeth of the ratchet wheel 34 of the actuating mechanism are reversely arranged when compared with the teeth of ratchet wheel 13. It will here be noted that when the solenoid core 22 is being raised the pawl 33 is serving to move the ratchet wheel 34 in the direction of the arrow Y and this while the ratchet wheel 13 is locked against movement, as above described. The ratchet wheel 34 has associated with it what is frequently herein referred to, as a second locking pawl 35 the free end of which is normally pressed toward its ratchet wheel 34 by a spring 36 carried by a bracket 37 upon one of the frame members. The pawl 35 has connected to it a piece of insulating material 38 to which there is connected by screws 39 a spring member 40 that carries a contact member 41. An inspection of Fig. 8 will show a small amount of lost motion between the engaging portion of the pawl 33 and the face of the ratchet tooth which is nearest to it, but this lost motion is taken up when the solenoid core 22 has been raised only a short distance. The continued upward movement of the core 22 turns the ratchet wheel 34 in the direction of the arrow Y and this causes the face 42 of a tooth on the ratchet wheel 34 to press downwardly against the surface of a locking portion 43 of the locking pawl 35 so as to force said locking pawl 35 away from the center about which the ratchet wheel 34 is being turned. This movement is sufficient and timed so as to cause the contact member 41 to engage a contact 44 that is carried by but insulated from one of the vertically extending frame members and thus close what has heretofore been described as the circuit maintaining and opening switch G. The contact 41 engages the contact 44 before the contacts 26 and 27 have become disengaged and the contacts 41 and 44 remain in engagement with each other until a tooth of the ratchet wheel 34 has moved past the engaging or locking portion of the pawl 43 at which time the engaging portion of the pawl 43 slides past the radial face of a tooth of the ratchet wheel 34 and assumes a normal position which it retains until the rewinding operation is again performed. It will here be noted that the contacts 41 and 44 cannot become disengaged until after the solenoid core 22 has been raised sufficiently to perform the complete winding operation.

While the core 22 is being lowered, or in other words while the clock is running down, the second ratchet-wheel moving pawl 33 slides over the teeth of its corresponding ratchet wheel 34 and during this time the ratchet wheel 34 is locked against movement in the direction of the arrow Z by its locking pawl, to wit, the second locking pawl 35. The ratchet wheel 34, Fig. 8, and its moving pawl 33 are clearly shown in Fig. 5 and the locking pawl associated with the ratchet wheel are clearly shown in Figs. 5 and 6. While these parts are shown in other figures, reference has been made to the figures just mentioned because of their clear showing in said figures. The ratchet wheel 34 of the actuating mechanism D is secured by means of a screw 45 to the shaft 17 previously referred to and to this shaft there is also secured a gear 46. This gear is secured in place by a pin 47 passing from the gear through the shaft. This gear 46 drives through a reducing train of gearing which gearing comprises gears 48, 49 and 50, a hollow shaft 51 which is concentric with, mounted upon and rotatable relative to the shaft 17. This hollow shaft has thereupon a disk 52 which is timed so as to make a revolution once in 24 hours and which is sub-divided into 24 equal units—corresponding to the number of hours in a day—and these units are sub-divided as desired. This disk is clamped in place between a shoulder 53 and a clamping nut 54. Upon or to this disk there are secured a pair of hands 55 which can be set as desired and which can be respectively secured in place by means of clamping screws 57 and 58 respectively. The clamping screws enter spaced threaded openings 59 and that portion of the hands through which the screws pass are slotted so that any desired adjustment or positioning of the ends m and n of the hands can be obtained. As the ratchet wheel 34 is moved the length of one tooth each time the solenoid B is energized it will be observed that a slight movement is imparted to the dial, due to the reducing train of gears, each time the solenoid is energized, and as previously indicated the movement is sufficient to cause the dial to make a complete revolution in 24 hours. This movement of the dial is therefore not a continuous movement but is made up of a series of movements which take place when one solenoid is energized; in other words, the power for moving the dial and the parts moved thereby is derived from the solenoid and is not dependent upon any power derived from the clock train. The function of the clock train is to cause a periodic closing of the small initial clock switch F which starts the operation of the solenoid but which switch opens before the electrical supply to the solenoid has been cut off. The ends m and n of the adjustable arms or hands 55 and 56 are arranged so that as they are rotated they engage teeth 60 of a wheel 61 of the driven member or rotatable main switch C.

*Driven member or rotatable main switch.*

Figure 2:
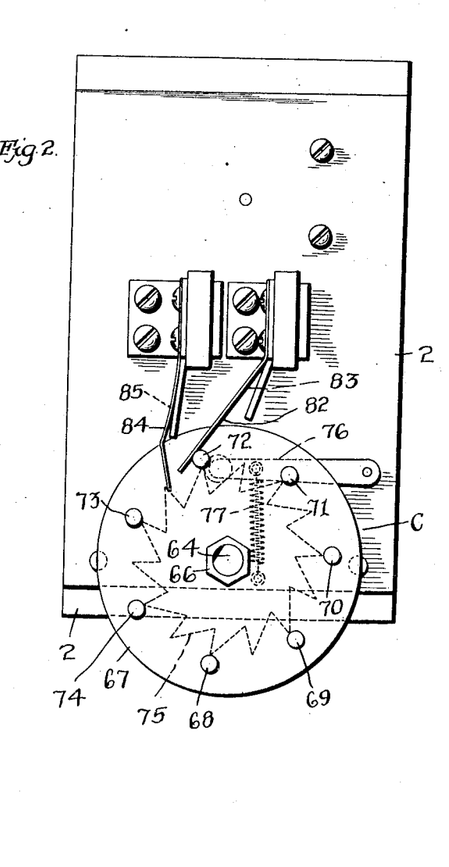
Fig. 2 is a rear elevational view of the switch shown in Fig. 1.

The wheel 61 is adjustably clamped in place between a collar 62 and a nut 63 to a shaft 64. To this shaft 64 there is secured, as by means of clamping nuts 65 and 66, a contact carrier of insulating material 67 through which there extends a series of contacts 68, 69, 70, 71, 72, 73, 74. To this shaft 64 there is also connected a ratchet wheel 75 with which there coöperates a pawl 76 the free end of which pawl is continuously forced inwardly by a tension spring 77. This ratchet wheel 75 is clamped in place between nuts 78 and 79 and a disk of insulating material 80 is clamped in place on the shaft 64 between nuts 79 and 81. The member which comprises the toothed wheel 61, the shaft 64, the contact carrier 67 and the contacts carried thereby may be considered to be a rotatable driven member and these parts constitute the driven member or rotatable main switch C previously referred to. Associated with the wheel 61 there may also be employed a disk, marked for instance for each day of the week. The shaft 64 rotates when it moves only in the direction of the arrow Z and when the shaft occupies the position shown in Fig. 2, that is with the contact as 72 in the position shown, a circuit is completed through contacts 82, 72 and 83. Now if the shaft 64 is moved through an arc equal to 360 degrees divided by the number of teeth on the ratchet wheel 75 then the contact 72 will be out of engagement with the contacts 82 and 83 and the contact 71 has not been moved to a position where it will engage contacts 82 and 83. If a circuit was formerly completed through contacts 82, 72 and 83 there will be no circuit through contacts 82 and 83 with the contact 72 in the new position, and if there were no other contacts no exterior or main circuit would be closed. In the construction shown, however, a second set of contacts, as 84 and 85, has been provided and with contact 72 in the new position it would engage with the contacts 84 and 85 and a circuit would be completed through contacts 84, 72 and 85. Such a circuit might be useful where it is desired to run only a few lights after a current for running motors and other power translating devices had been shut off. If the shaft 64 were given another movement in the direction of the arrow Z then the contact 71 would be brought into engagement with the contacts 82 and 83 and simultaneously with this movement contact 72 would be carried out of engagement with the contacts 82 and 83.

The switch construction thus described may be considered as a main switch for controlling the supply of electricity to circuits which are exterior to the circuits that control the energizing of the solenoid B. In order to minimize sparking which takes place when a circuit has been disrupted there has been provided the pawl and ratchet wheel mechanism which comprises the ratchet wheel 75 and the pawl 76 previously referred to. When the hands or arms 55 and 56 that are on the pawl have engaged the teeth 60 so as to impart a partial rotation toward the place where a contact, as 72, is to be disengaged, the spring-pressed pawl 76 comes into play so as to effect a quick movement of the movable contact, as 72, away from the stationary contacts, as 82 and 83, which had been previously engaged by the movable contact. The spring-pressed pawl 76, therefore, effects the final movement of the movable contact of the main switch away from the stationary contacts and also the final movement of a movable contact member of the main switch into engagement with its corresponding stationary contacts. This pawl 76 also prevents a turning of the switch 64 in a backward direction but the shaft 64 can be turned in a forward direction, as in the direction Z, Fig. 2, by grasping the bar 86.

Figure 1:
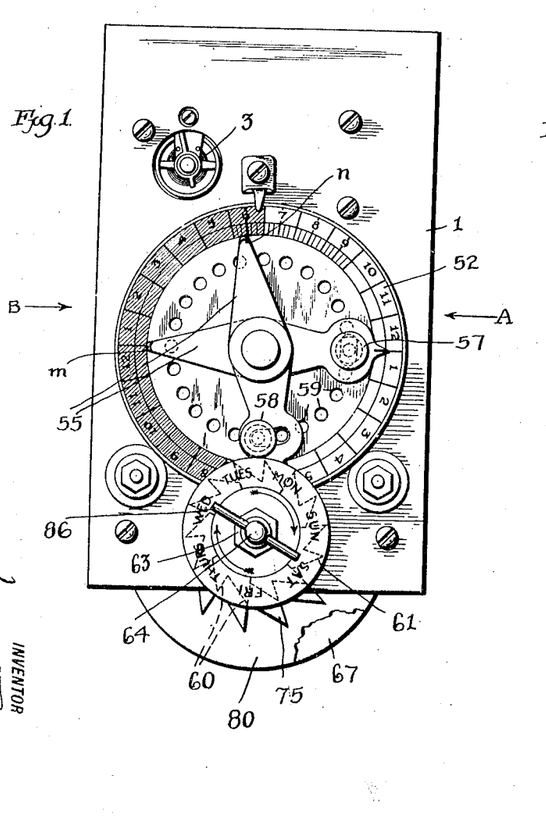
Figure 1 is a front elevational view of a time switch embodying the invention.
Figure 9:
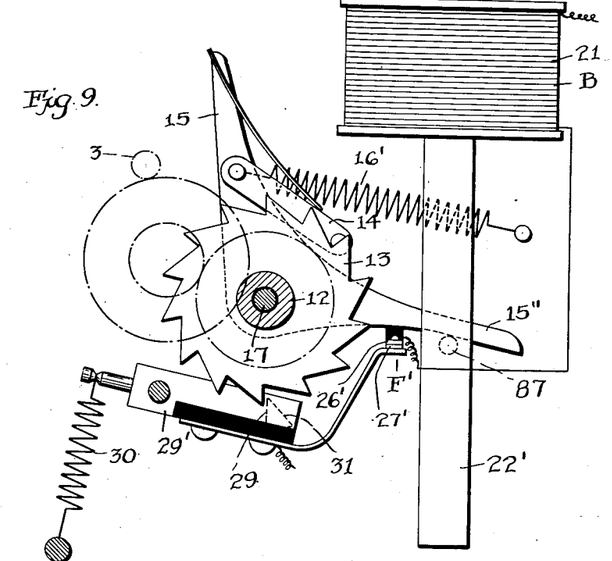

A construction is shown in Fig. 9 which differs somewhat from the construction shown in Fig. 8. In Fig. 9 there is indicated the ratchet wheel construction of the clock train and also the initial clock switch, which clock switch is indicated as F' but corresponds in its function and mode of operation to the clock switch F previously described. In Fig. 9 the carrier has an extension 15" which is engaged by a member 87 of the core 22' only when the core is being raised; that is when the solenoid core is energized. When the solenoid is not energized the core is free to fall and exerts no weight on the clock train. In this construction the entire energy for maintaining the clock running is provided by means of the spring 16'. In Fig. 9 a contact 26' of the initial or clock closing switch F' is on the extension 15" of the pawl carrier and the locking pawl which coöperates with the ratchet wheel shown in said figure carries the other contact member 27' of the clock closing switch F'. This contact member 27' is insulated, as will be clear from an inspection of Fig. 9, from the rest of the locking pawl with which it is associated. The pawl and ratchet construction and the clock switch shown and described in connection with Fig. 9 are similar to the corresponding construction shown and described in connection with Figs. 1 and 8 and further description of that portion illustrated in Fig. 9 is believed to be unnecessary.

Figure 10:
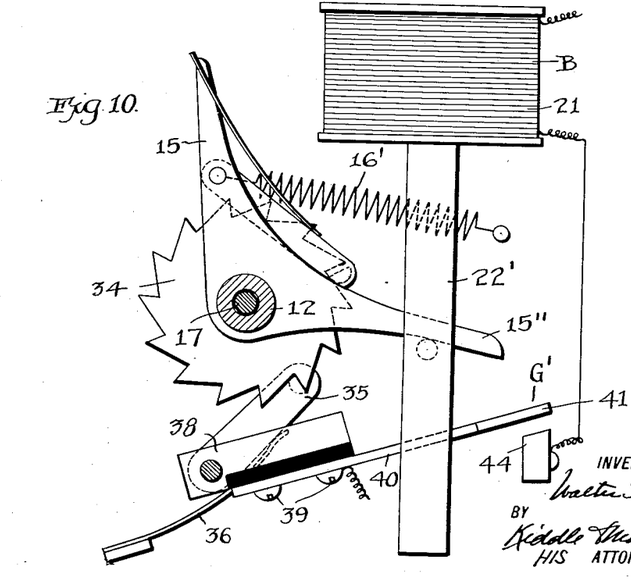
Fig. 10 illustrates the mechanism for actuating a rotatable driven member by means of a movable core of a solenoid. There is also associated with this actuating mechanism a circuit maintaining and opening switch for maintaining the solenoid circuit closed and for opening the solenoid circuit immediately after the solenoid core, by its movement, has accomplished its work.

In Fig. 10 there are shown the pawl and ratchet mechanism of the actuating mechanism and the locking pawl and circuit maintaining and closing switch associated therewith. In this construction the carrier that supports the ratchet-wheel moving pawl may be the same carrier as that shown in Fig. 9, or it may be an independent carrier. In Fig. 10 the extension 15" is necessarily engaged by the pin on the core 22' only when the core is being lifted. If the carrier shown in Fig. 10 is the same carrier as that shown in Fig. 9, that is, if the carriers are merged or connected, then the two carriers will move together; if, however, the carrier in Fig. 10 is a different carrier from that shown in Fig. 9 then the coil spring indicated in Fig. 10 will restore the carrier to its lowest position ready for its next operation to move the actuating mechanism when the core of the solenoid is again energized. The maintaining and opening switch G' of this Fig. 10 operates the same as the clock maintaining and opening switch shown and described in connection with Figs. 1 and 8.

Operation.

The operation of the switch is as follows:
Starting with the clock wound, energy is supplied to the clock train by means of the spring 16. It will be noted, however, that some or all of the energy for running the clock train could be supplied by the core 22 which is in effect a weighted member, if such a construction were desired. The pawl and ratchet mechanism which comprises the ratchet-wheel moving pawl 14 and the ratchet wheel 13 of the clock train provide the means whereby the power, as from the spring or the spring and the core, can be supplied to and through the rest of the gears of the clock train and whereby a rewinding operation can take place when the clock is run down as far as it is desired.

The clock train mechanism is controlled by the escapement mechanism 3. When the clock is being rewound the ratchet-wheel moving pawl 14 slides over the inclined portion of the teeth of the ratchet wheel 13. While this sliding of the pawl 14 is taking place the ratchet wheel 13 is held against movement in the direction of the arrow Y by means of the locking pawl 29 with which there is associated a movable contact 27. This locking pawl 29 springs to a position where it can perform its locking function before the sliding movement of the pawl 14 takes place. The locking pawl is permitted to move in the manner described, due to the high point of a tooth on the ratchet wheel 13 sliding past the pawl 29, as the clock is running down. The locking pawl 29 continues to perform its locking function on the ratchet wheel 13 during the entire rewinding operation which is until the ratchet-wheel moving pawl 14 has been moved a sufficient distance to engage the vertical portion of a ratchet tooth succeeding the tooth which it previously operatively engaged. The ratchet-wheel moving pawl 14 is now in position to perform its function of imparting energy supplied by the spring or the spring and the core of the ratchet wheel while the clock is running down. The moving of the contact 27, when the locking pawl 29 comes into play to perform its locking function, is sufficient to cause it, the contact, to engage contact 26 and the contacts 26 and 27 constitute what has heretofore been described as the initial closing switch. The closing of this switch completes the circuit in which the coil 21 of the solenoid is included and this energizes the solenoid whereby the rewinding operation can be started by raising the core 22. The raising of the core 22 causes the ratchet-wheel moving pawl 33 to engage the teeth of the ratchet wheel 34 and the ratchet-wheel moving pawl and ratchet wheel just described constitute the ratchet and pawl mechanism of the actuating mechanism for moving a main switch or other driven member. The ratchet wheel 34 has associated with it a locking pawl 35 that has connected to it a movable contact 41. As the rewinding operation proceeds the pawl 33 imparts a partial rotary movement to the ratchet wheel 34 and the inclined surface of the teeth of the ratchet wheel 34 engages a part of the locking pawl or stop 35 sufficiently to move the free end of the locking pawl away from the center about which the ratchet wheel 34 is turning. This movement away from the center is sufficient to cause the contact 41 associated with the locking pawl to engage a corresponding contact 44 so as to close a switch including these two contacts before the initial closing switch is opened. The contacts 41 and 44 constitute what has been referred to as the maintaining and opening switch and are included in the circuit in which the coil 21 of the solenoid is included. The maintaining and opening switch remains closed until the rewinding operation is entirely completed at the end of which time the locking pawl 35 is allowed to move inwardly due to the outer end of a tooth on the pawl 35 moving past it and thereafter the locking pawl 35 can perform its locking function while the moving pawl 33 is being slid over an inclined portion of the tooth on the ratchet wheel 34. When the locking pawl 35 moves in position to perform its locking function it automatically opens the maintaining and opening switch whereby the circuit that includes the coil 21 of the solenoid is opened and the clock then continues to run until a succeeding rewinding operation is performed.

The operation of the driven member or main switch from the actuating mechanism has heretofore been described and further description thereof at this time is believed to be unnecessary. It will be noted, however, that the actuating mechanism which comprises the ratchet wheel 34 and the ratchet-wheel moving pawl 33 is a mechanism whereby a driven member or main switch can be actuated by the moving of a core of a solenoid when the coil of the solenoid is energized. This actuating mechanism also comprises, as has been pointed out in the description of this actuating mechanism, a set of positionable hands or arms 55 and 56 which can be relied upon to determine when the driven member or main switch will be positioned through the medium of the actuating mechanism.

The operation of the construction shown in Figs. 9 and 10 is similar to the operation of the corresponding parts shown and described in connection with the remaining figures of the drawings in the case and as the points of difference have heretofore been pointed out further description of the mode of operation is believed to be unnecessary at this time.

The improvements herein set forth are not limited to the precise construction and arrangement shown and described for they may be embodied in various forms and modifications without departing from the spirit and scope of the invention.

What I claim is:

1. A time switch comprising in combination a timing mechanism, a main switch-operating mechanism, a solenoid having a core for periodically winding the timing mechanism and for actuating the main switch-operating mechanism whereby the main switch will be opened and closed at predetermined periods, the coil of the solenoid being included in an electrical circuit having a clock switch which is associated with a clock so that said clock switch is periodically closed whereby the solenoid is energized to wind the clock, and a solenoid-circuit maintaining and opening switch associated with the main switch-operating mechanism and constructed and arranged so that said solenoid-circuit maintaining and opening switch is closed prior to the opening of the clock switch but is opened after the opening of the clock switch.

2. A time switch comprising in combination a timing element, a motor for periodically winding the timing element, a main switch-operating mechanism actuated by said motor, a circuit within which said motor is included, which circuit has in parallel a clock switch, and a circuit maintaining and opening switch, the clock switch being associated with the timing element so that periodically said motor circuit will be completed by a closing of the clock switch, the circuit maintaining and opening switch being actuated by the main switch-operating mechanism so that while the circuit is still maintained through the clock switch the maintaining switch will be closed and will remain closed until the motor has been operated to accomplish its function, the construction being such that the clock switch is opened prior to the opening of the maintaining switch.

3. A time switch comprising in combination a clock or timing mechanism, a solenoid having a movable core, an initial-closing switch in the solenoid circuit and associated with said clock so as to be periodically closed to establish and complete said circuit, a main switch-operating mechanism actuated by the core of said solenoid when the solenoid is energized, a solenoid-circuit maintaining switch associated with the main switch-operating mechanism so that when said main switch-operating mechanism has been partially moved by said solenoid, during a part of the movement of the solenoid, said maintaining switch will be closed and will remain closed until the solenoid core has completed its movement at which time the solenoid circuit will be disrupted due to the opening of said maintaining switch, the clock switch having been automatically opened prior to the movement of the solenoid core having been completed.

4. A time switch comprising in combination a clock or timing mechanism, a solenoid having a movable core, means for periodically closing the solenoid circuit to rewind the clock at regular intervals, a main switch for controlling the opening and closing of a circuit other than that in which the solenoid is included, a rotatable member for actuating said main switch, and means between said rotatable member and said solenoid whereby each time the solenoid core is moved by the energizing of the solenoid said rotatable member will be partially moved by said core.

5. A time switch comprising in combination a clock for timing mechanism, a solenoid having a movable core, means for periodically closing the solenoid circuit to rewind the clock at regular intervals by the movement of said core, a main switch for controlling the opening and closing of a circuit other than that in which the solenoid is included, a rotatable member for actuating said main switch, and means between said rotatable member and said core whereby each time the core is moved by the energizing of the solenoid said rotatable member will be partially moved by said core.

6. A time device comprising in combination a clock or timing mechanism, a solenoid having a core that reciprocates, the solenoid being in a circuit the closing of which is controlled by a switch associated with said clock or timing mechanism, a rotatable driven member, actuating mechanism between the core and the rotatable driven member, a switch associated with said actuating mechanism and arranged to disrupt the circuit when the actuating mechanism has been moved by the core the required distance, said actuating mechanism comprising adjustable hands arranged to engage a member connected to the rotatable driven member, said rotatable driven member being moved by the actuating mechanism through the medium of one of the hands upon a predetermined number of movements of the core and to another desired distance through the medium of the other hand upon a predetermined number of subsequent movements of the core, and means for locking the rotatable driven member against backward rotary movement.

This specification signed and witnessed this 10th day of August A. D. 1917.

WALTER S. RYAN.

Signed in the presence of—
W. C. MARGESON,
G. McGRANN.